(12) United States Patent
Salter et al.

(10) Patent No.: US 12,468,383 B2
(45) Date of Patent: Nov. 11, 2025

(54) GAZE AND HEAD POSE INTERACTION

(71) Applicant: Apple Inc., Cupertino, CA (US)

(72) Inventors: Thomas G. Salter, Foster City, CA (US); Anshu K. Chimalamarri, Sunnyvale, CA (US); Bryce L Schmidtchen, San Francisco, CA (US); Devin W. Chalmers, Oakland, CA (US); Gregory Lutter, Boulder Creek, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/374,125

(22) Filed: Sep. 28, 2023

(65) Prior Publication Data

US 2024/0019928 A1   Jan. 18, 2024

Related U.S. Application Data

(63) Continuation of application No. PCT/US2022/020565, filed on Mar. 16, 2022.
(Continued)

(51) Int. Cl.
G06F 3/01 (2006.01)
G06F 1/16 (2006.01)

(52) U.S. Cl.
CPC .............. G06F 3/012 (2013.01); G06F 1/163 (2013.01); G06F 3/013 (2013.01)

(58) Field of Classification Search
CPC ........... G06F 1/163; G06F 3/012; G06F 3/013
See application file for complete search history.

(56) References Cited

U.S. PATENT DOCUMENTS 10,395,428 B2   8/2019   Stafford et al.
10,453,175 B2   10/2019  Mierle et al.
(Continued)

FOREIGN PATENT DOCUMENTS

JP   2000163196 A  *  6/2000  ............ G06F 3/013
KR   20150129546 A  *  11/2015
(Continued)

OTHER PUBLICATIONS

Diako Mardanbegi et al., "Eye-based head gestures," Proceedings of the symposium on eye tracking research and applications, 2012, pp. 139-146.
(Continued)

Primary Examiner — Stacy Khoo
(74) Attorney, Agent, or Firm — FERNANDO & PARTNERS, LLP

(57) ABSTRACT

Various implementations disclosed herein include devices, systems, and methods for using a gaze vector and head pose information to effectuate a user interaction with a virtual object. In some implementations, a device includes a sensor for sensing a head pose of a user, a display, one or more processors, and a memory. In various implementations, a method includes displaying a set of virtual objects. Based on a gaze vector, it is determined that a gaze of the user is directed to a first virtual object of the set of virtual objects. A head pose value corresponding to the head pose of the user is obtained. An action relative to the first virtual object is performed based on the head pose value satisfying a head pose criterion.

18 Claims, 13 Drawing Sheets

Related U.S. Application Data

(60) Provisional application No. 63/169,347, filed on Apr. 1, 2021.

(56) References Cited

U.S. PATENT DOCUMENTS

| | | | |
|---|---|---|---|
| 10,558,272 B2 | 2/2020 | Parshionikar | |
| 2013/0340006 A1* | 12/2013 | Kwan | H04N 21/2665 |
| | | | 725/39 |
| 2014/0362110 A1 | 12/2014 | Stafford | |
| 2015/0212576 A1* | 7/2015 | Ambrus | G06F 3/0482 |
| | | | 345/156 |
| 2016/0063762 A1* | 3/2016 | Heuvel | G06F 3/011 |
| | | | 345/633 |
| 2017/0061694 A1* | 3/2017 | Giraldi | G06F 3/16 |
| 2019/0362557 A1 | 11/2019 | Lacey et al. | |
| 2019/0369716 A1 | 12/2019 | Chen et al. | |
| 2020/0202629 A1* | 6/2020 | Sharma | G02B 27/0172 |
| 2020/0209624 A1 | 7/2020 | Sztuk et al. | |

FOREIGN PATENT DOCUMENTS

| | | | | |
|---|---|---|---|---|
| WO | WO-2018195099 A1 * | 10/2018 | | G02B 27/017 |
| WO | WO-2020084625 A1 * | 4/2020 | | A61B 90/37 |

OTHER PUBLICATIONS

PCT International Search Report and Written Opinion dated Jun. 14, 2022, PCT International Application No. PCT.US2022/020565, pp. 1-11.

\* cited by examiner

GAZE AND HEAD POSE INTERACTION

CROSS-REFERENCE TO RELATED APPLICATION

This application is a continuation of Intl. Patent App. No. PCT/US2022/20565, filed on Mar. 16, 2022, which claims priority to U.S. Provisional Patent App. No. 63/169,347, filed on Apr. 1, 2021, which are incorporated by reference in their entirety.

TECHNICAL FIELD

The present disclosure generally relates to interacting with computer-generated content.

BACKGROUND

Some devices are capable of generating and presenting graphical environments that include many objects. These objects may mimic real world objects. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
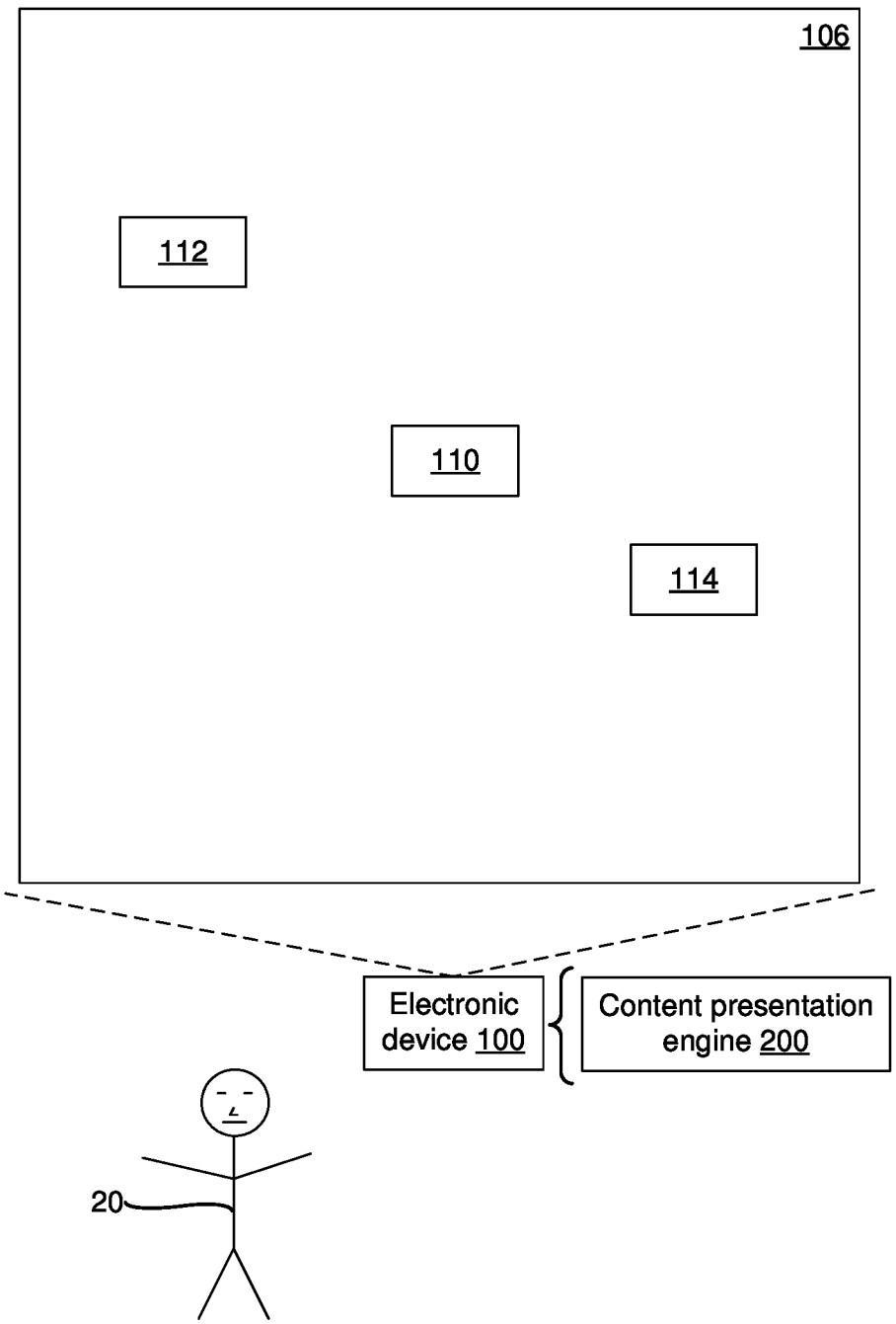
FIGS. 1A-1I are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for using a gaze vector and head pose information to effectuate a user interaction with a virtual object in an extended reality (XR) environment. In some implementations, a head-worn device includes a sensor for sensing a head pose of a user, a gaze-tracking device, a display, one or more processors, and a memory. In various implementations, a method includes displaying, on the display, a set of virtual objects in an XR environment. The head-worn device obtains a gaze vector via the gaze-tracking device. Based on the gaze vector, it is determined that a gaze of the user is directed to a first virtual object of the set of virtual objects. A head pose value corresponding to the head pose of the user is obtained via the sensor. An action relative to the first virtual object is performed based on the head pose value satisfying a head pose criterion.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

Implementations described herein contemplate the use of gaze information to determine virtual objects at which a user's attention is focused. Implementers should consider the extent to which gaze information is collected, analyzed, disclosed, transferred, and/or stored, such that well-established privacy policies and/or privacy practices are respected. These considerations should include the application of practices that are generally recognized as meeting or exceeding industry requirements and/or governmental requirements for maintaining the user privacy. The present disclosure also contemplates that the use of a user's gaze information may be limited to what is necessary to implement the described embodiments. For instance, in implementations where a user's device provides processing power, the gaze information may be processed at the user's device, locally.

Some devices display an extended reality (XR) environment that includes one or more objects, e.g., virtual objects. A user may select or otherwise interact with the objects through a variety of modalities. For example, some devices allow a user to select or otherwise interact with objects using a gaze input. A gaze-tracking device, such as a user-facing image sensor, may obtain an image of the user's pupils. The image may be used to determine a gaze vector. The gaze-tracking device may use the gaze vector to determine which object the user intends to select or interact with. When using a gaze-tracking device, a user may find it difficult to select or interact with objects in an XR environment using a gaze input. Relying on a gaze input may result in false positives, e.g., registering a user selection of an object when no selection was intended. Accordingly, the user may select or interact with unintended objects, degrading the user experience. Power consumption may be adversely affected by the additional inputs involved in correcting false positives.

The present disclosure provides methods, systems, and/or devices for using a combination of a gaze vector and head pose information to effectuate a user interaction with an object in an XR environment. In some implementations, a device displays an XR environment including one or more objects. The device determines a gaze vector and uses the gaze vector to determine an object in the XR environment on which a user is focusing on. In some implementations, the device receives head pose information as an input corresponding to a user interaction with the object on which the user's attention is focused. For example, the user may perform a nodding motion to select the object. In some implementations, using the head pose information to confirm selection of an object on which the user's attention is focused improves the accuracy of registering user selections of objects, e.g., by reducing false positives. The number of user inputs that are provided by the user may be reduced, for example, by reducing the number of inputs that are needed to correct for false positives. Battery life and the user experience may be enhanced as a result.

FIG. 1A is a block diagram of an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes an electronic device 100 and a content presentation engine 200. In some implementations, the electronic device 100 includes a handheld computing device that can be held by a user 20. For example, in some implementations, the electronic device 100 includes a smartphone, a tablet, a media player, a laptop, or the like. In some implementations, the electronic device 100 includes a wearable computing device that can be worn by the user 20. For example, in some implementations, the electronic device 100 includes a head-worn device (e.g., a head-mountable device (HMD)) or an electronic watch.

In the example of FIG. 1A, the content presentation engine 200 resides at the electronic device 100. For example, the electronic device 100 implements the content presentation engine 200. In some implementations, the electronic device 100 includes a set of computer-readable instructions corresponding to the content presentation engine 200. Although the content presentation engine 200 is shown as being integrated into the electronic device 100, in some implementations, the content presentation engine 200 is separate from the electronic device 100. For example, in some implementations, the content presentation engine 200 resides at another device (e.g., at a controller, a server or a cloud computing platform).

As illustrated in FIG. 1A, in some implementations, the electronic device 100 presents an extended reality (XR) environment 106. In some implementations, the XR environment 106 is referred to as a computer graphics environment. In some implementations, the XR environment 106 is referred to as a graphical environment. In some implementations, the electronic device 100 generates the XR environment 106. Alternatively, in some implementations, the electronic device 100 receives the XR environment 106 from another device that generated the XR environment 106.

In some implementations, the XR environment 106 includes a virtual environment that is a simulated replacement of a physical environment. In some implementations, the XR environment 106 is synthesized by the electronic device 100. In such implementations, the XR environment 106 is different from a physical environment in which the electronic device 100 is located. In some implementations, the XR environment 106 includes an augmented environment that is a modified version of a physical environment. For example, in some implementations, the electronic device 100 modifies (e.g., augments) the physical environment in which the electronic device 100 is located to generate the XR environment 106. In some implementations, the electronic device 100 generates the XR environment 106 by simulating a replica of the physical environment in which the electronic device 100 is located. In some implementations, the electronic device 100 generates the XR environment 106 by removing and/or adding items from the simulated replica of the physical environment in which the electronic device 100 is located.

In some implementations, the XR environment 106 includes various virtual objects such as an XR object 110 ("object 110", hereinafter for the sake of brevity). In some implementations, the XR environment 106 includes multiple objects. In the example of FIG. 1A, the XR environment 106 includes objects 110, 112, and 114. In some implementations, the virtual objects are referred to as graphical objects or XR objects. In various implementations, the electronic device 100 obtains the virtual objects from an object datastore (not shown). For example, in some implementations, the electronic device 100 retrieves the object 110 from the object datastore. In some implementations, the virtual objects represent physical articles. For example, in some implementations, the virtual objects represent equipment (e.g., machinery such as planes, tanks, robots, motorcycles, etc.). In some implementations, the virtual objects represent fictional articles (e.g., entities from fictional materials, for example, an action figure or a fictional equipment such as a flying motorcycle).

Figure 1B:
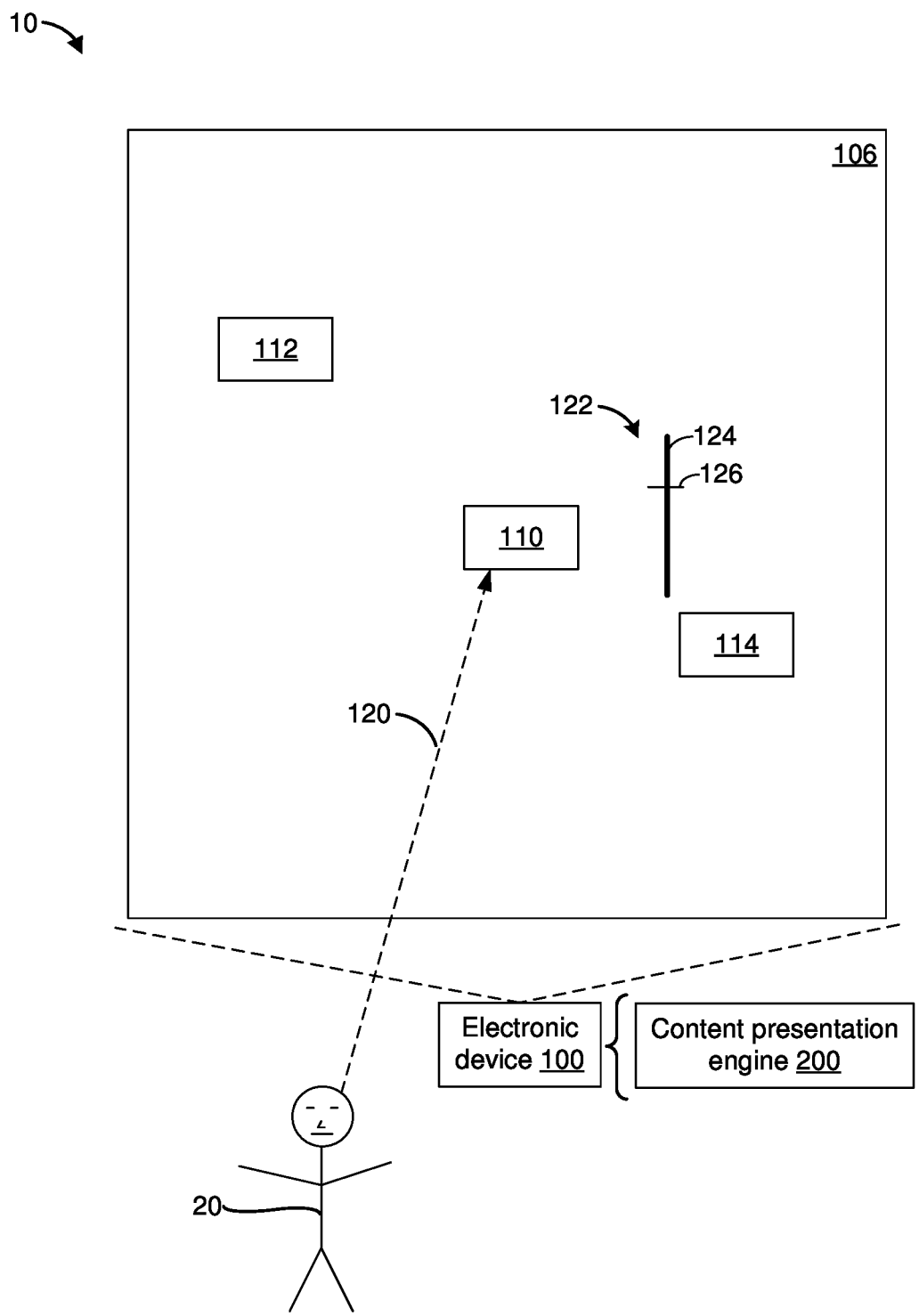

In various implementations, as illustrated in FIG. 1B, the electronic device 100 (e.g., the content presentation engine 200) determines a gaze vector 120. For example, the electronic device 100 may include a user-facing image sensor (e.g., a front-facing camera or an inward-facing camera). In some implementations, the user-facing image sensor captures a set of one or more images of the eyes of the user 20. The electronic device 100 may determine the gaze vector 120 based on the set of one or more images. Based on the gaze vector 120, the electronic device 100 may determine that a gaze of the user is directed to one of the objects. For example, as illustrated in FIG. 1B, the gaze of the user is directed to the object 110. In some implementations, the electronic device 100 may display a visual effect 122 in connection with the object 110. For example, the electronic device 100 may display an area of increased brightness around the object 110. As another example, the electronic device 100 may display an animation of the object 110. In some implementations, the visual effect 122 can include an indication of the motion required to select or activate the gazed at object 110, the user's current head pose value 130, or both. For example, if a vertical nodding motion is needed to select or activate object 110, a vertical bar or slider 124 can be displayed having an indicator 126 of the user's current head pose value 130 positioned thereon. As the user nods their head, the indicator 126 can be moved downward on the vertical bar or slider 124 until the head pose value 130 reaches a threshold head pose needed to select or activate the object 110, which may correspond to the bottom of the vertical bar or slider 124. A similar visual effect 122 can be displayed for motions in other directions or having other threshold head pose values.

Figure 1C:
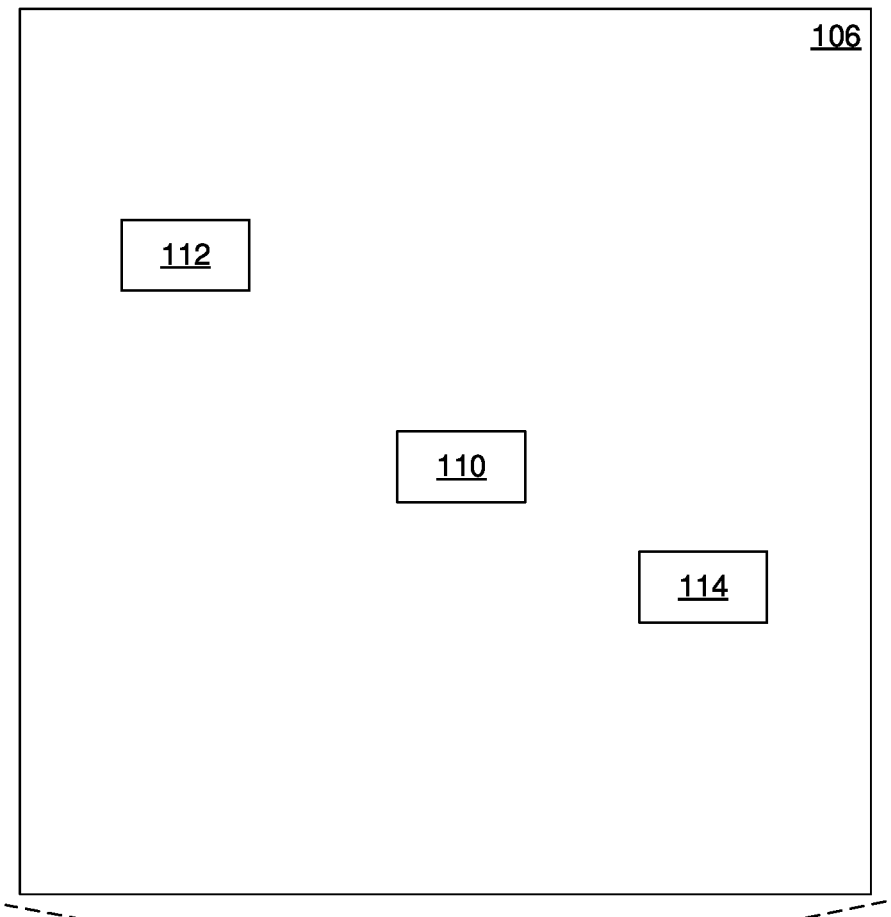
Figure 1C:
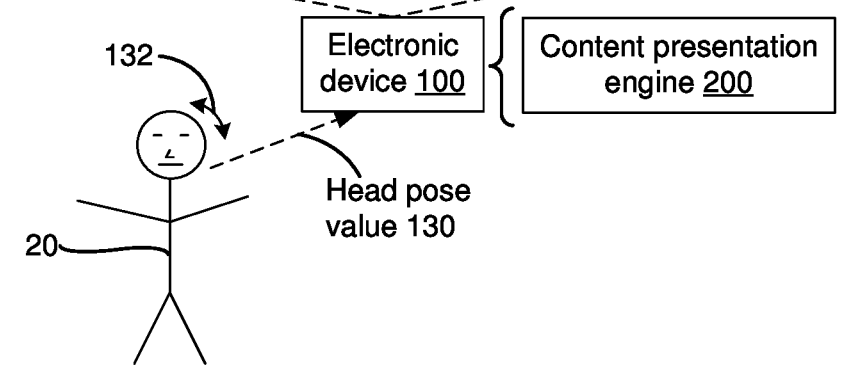

In some implementations, as represented in FIG. 1C, the electronic device 100 (e.g., the content presentation engine 200) obtains a head pose value 130 that corresponds to a head pose 132 of the user 20. For example, the electronic device 100 may include one or more sensors that are configured to sense the position and/or motion of the head of the user 20. The one or more sensors may include, for example, an image sensor, an accelerometer, a gyroscope, a magnetometer, and/or an inertial measurement unit (IMU). The one or more sensors that are configured to sense the position and/or motion of the head of the user 20 may be referred to as a head pose sensor.

Figure 1D:
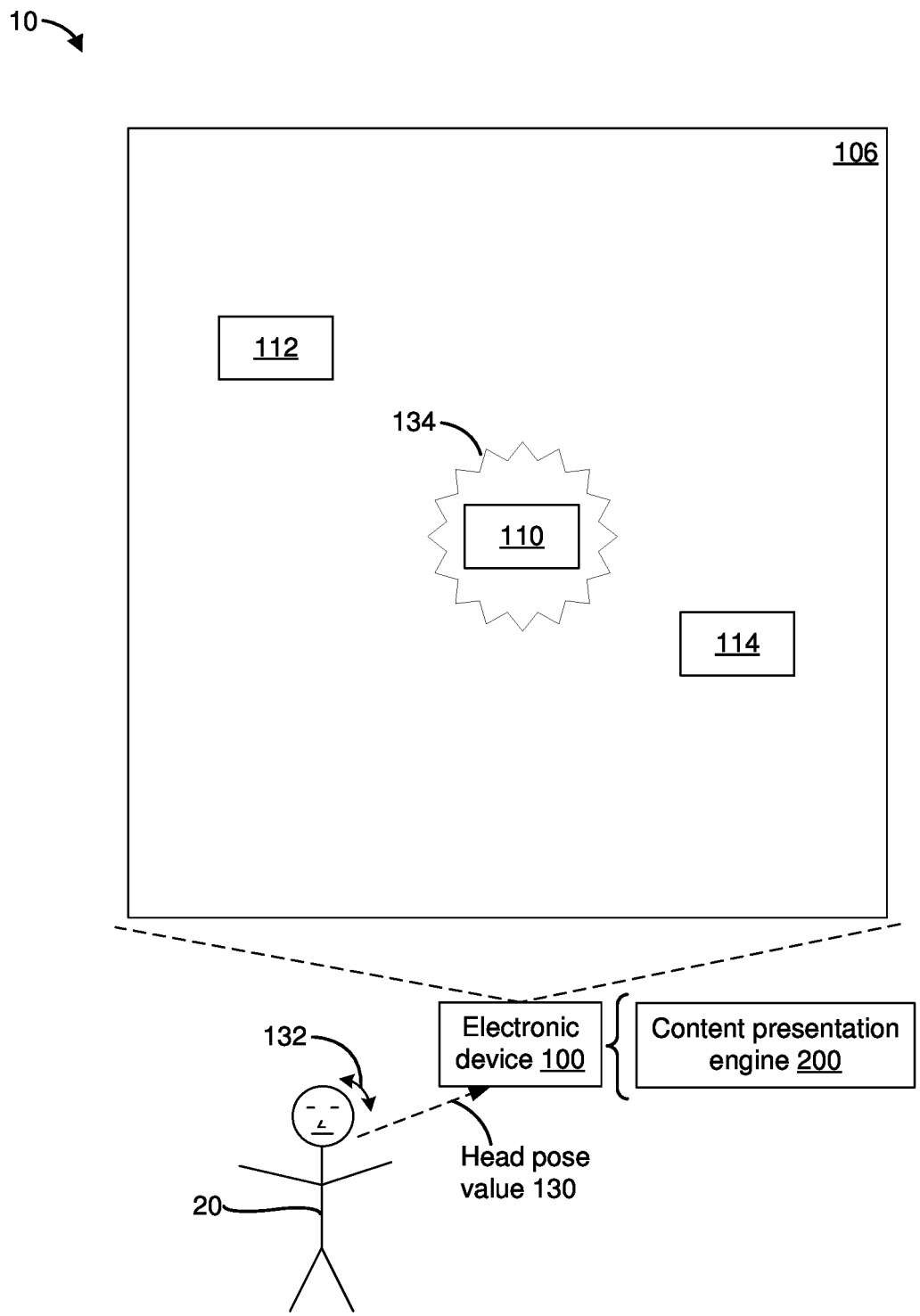

In some implementations, the electronic device 100 performs an action relative to the object 110 based on the head pose value 130 satisfying a head pose criterion. For example, the head pose criterion may be that a nodding motion exceeds a threshold range of motion. If the head pose value 130 corresponds to a nodding motion that exceeds the threshold range of motion, the electronic device 100 may perform an action. For example, as illustrated in FIG. 1D, the electronic device 100 selects the object 110. The electronic device 100 may display a visual effect 134 in connection with the object 110 to indicate that the object 110 has been selected. The visual effect 134 for indicating a selection may be the same or different than the visual effect 122 for indicating that the user's gaze is directed to the object 110. For example, the electronic device 100 may display an area of increased brightness around the object 110 to indicate that the object 110 has been selected. As another example, the electronic device 100 may indicate selection of the object 110 by displaying an animation of the object 110. In other implementations, audible or haptic effects may be presented to indicate a selection or activation of the object 110.

In some implementations, the action includes a user interface operation. The user interface operation may be performed on the device. In some implementations, the user interface operation is performed on another device. For example, the action may include transmitting a command to the other device to perform the user interface operation. Examples of user interface operations may include, but are not limited to, selecting and/or moving an object, opening a menu relating to the object, previewing and/or opening a content item relating to the object, and/or performing a default operation associated with the object. In some implementations, the object comprises a notification, and the user interface operation includes expanding and/or dismissing the notification.

Figure 1E:
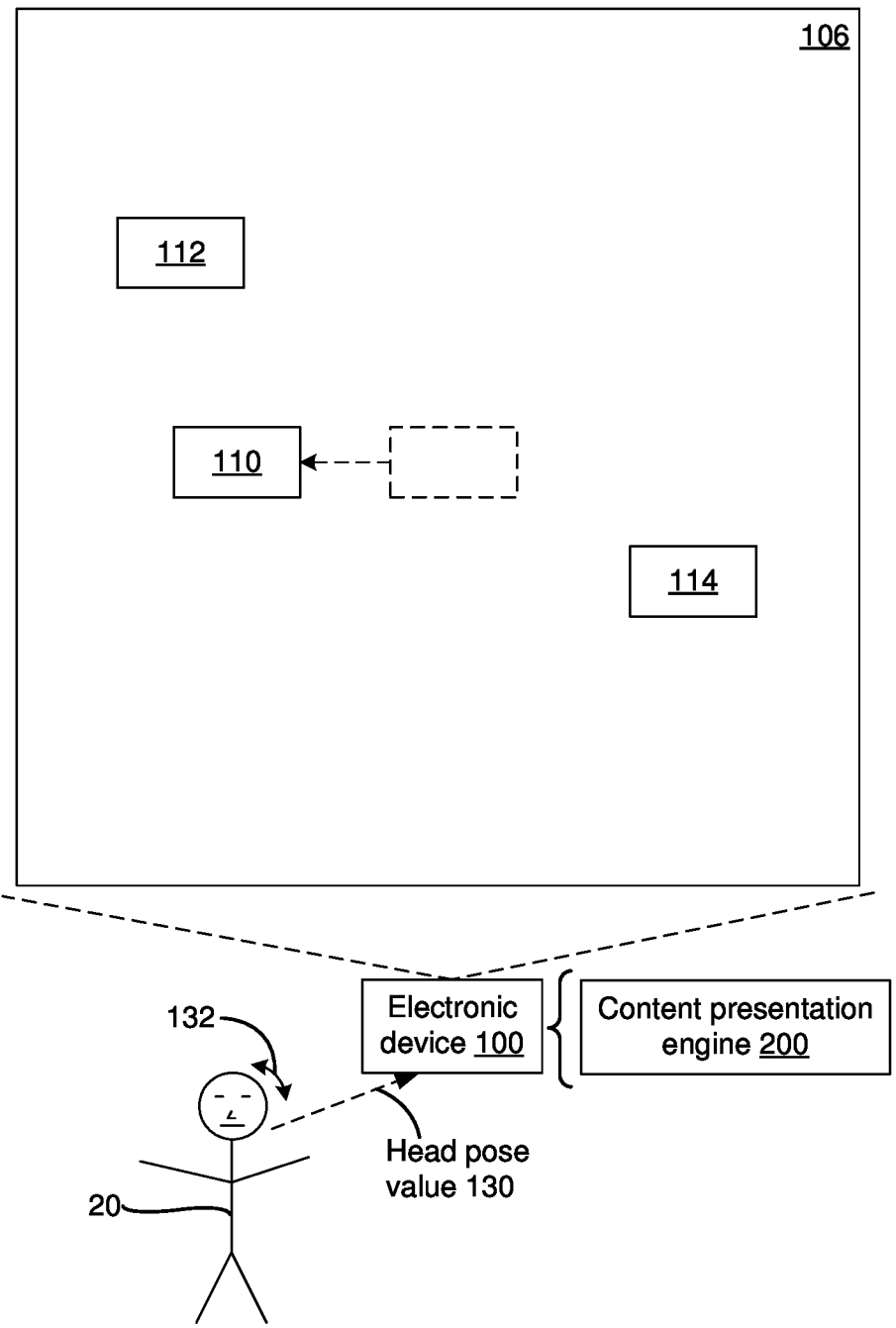

In various implementations, the action includes a user interface operation that involves modifying a display of one or more user interface elements. In some implementations, as represented in FIG. 1E, the electronic device 100 may display a movement of the object 110 according to the head pose value 130. For example, the electronic device 100 may display a movement of the object 110 in a direction similar to a direction of a movement of the head of the user 20. In some implementations, the electronic device 100 may continue to display the movement of the object 110 while the head pose value 130 satisfies a head pose criterion and, e.g., may display the object 110 with no movement when the head pose value 130 no longer satisfies the head pose criterion.

Figure 1F:
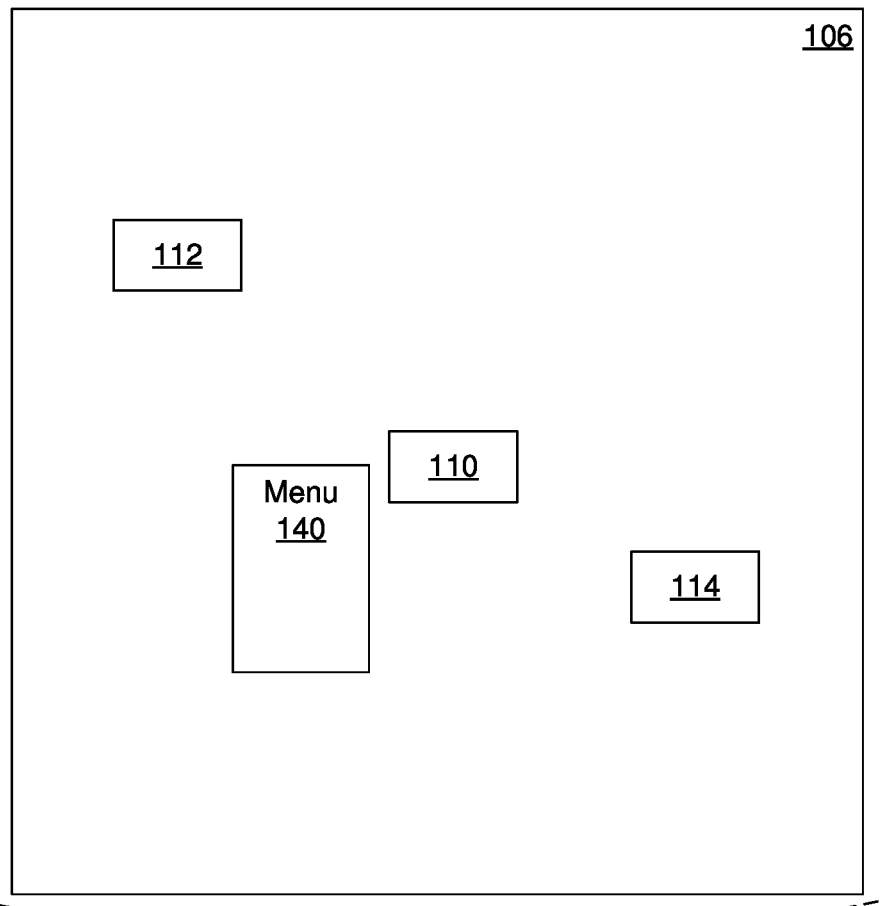
Figure 1F:
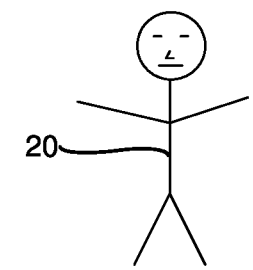

As represented in FIG. 1F, the electronic device 100 may open a menu relating to the object 110 based on the head pose value 130 satisfying a head pose criterion. For example, the head pose criterion may be that a rotational motion of the head exceeds a threshold degree of rotation. If the head pose value 130 corresponds to a rotational motion of the head exceeding the threshold degree of rotation, the electronic device 100 may display a menu 140 near the object 110. The menu 140 may allow the user 20 to initiate various operations in connection with the object 110, such as copying, deleting, selecting, deselecting, and/or editing the object 110. In some implementations, the electronic device 100 may display the menu 140 until the user dismisses the menu by performing another gesture. For example, the electronic device 100 may display the menu 140 until the head pose value 130 no longer corresponds to the threshold head pose.

Figure 1G:
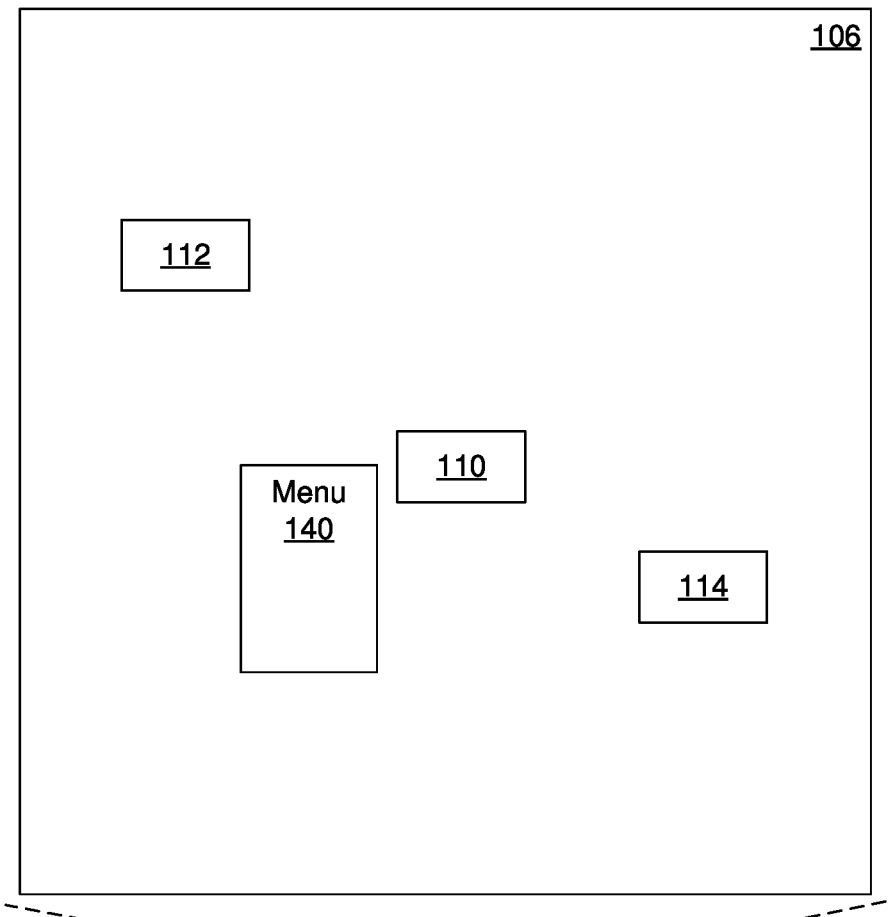
Figure 1G:
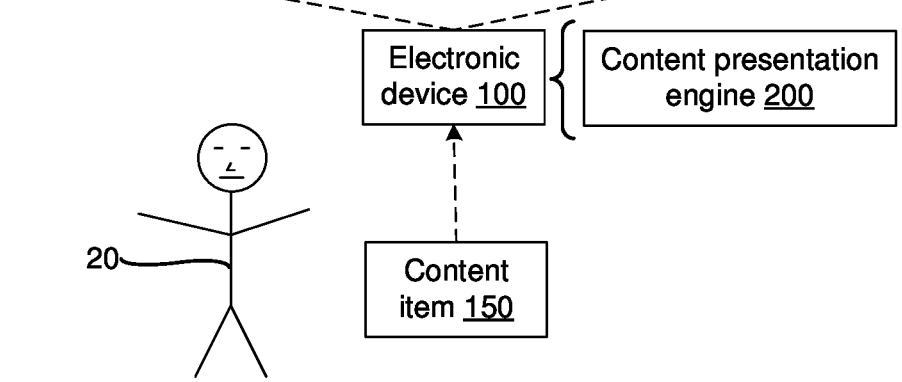

In some implementations, as represented in FIG. 1G, the electronic device 100 opens a content item 150 that is associated with the object 110 based on the head pose value 130 satisfying a head pose criterion. For example, the head pose criterion may be that a lateral motion of the head exceeds a threshold range of motion. If the head pose value 130 corresponds to a lateral motion of the head exceeding the threshold range of motion, the electronic device 100 may access the content item 150. The content item 150 may be or may include an audio content item, a video content item, an image, and/or a document. In some implementations, the content item 150 is stored in the electronic device 100. In some implementations, the content item 150 is stored externally from the electronic device 100 and is accessed remotely by the electronic device 100, e.g., via a communication network.

Figure 1H:
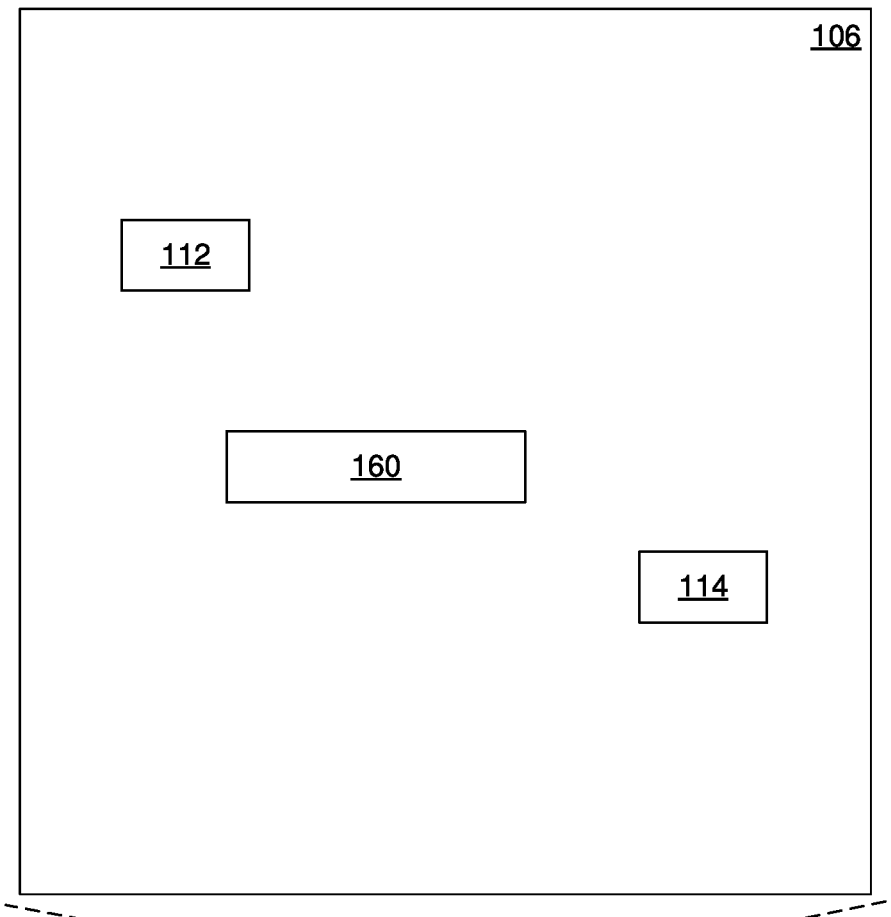
Figure 1H:
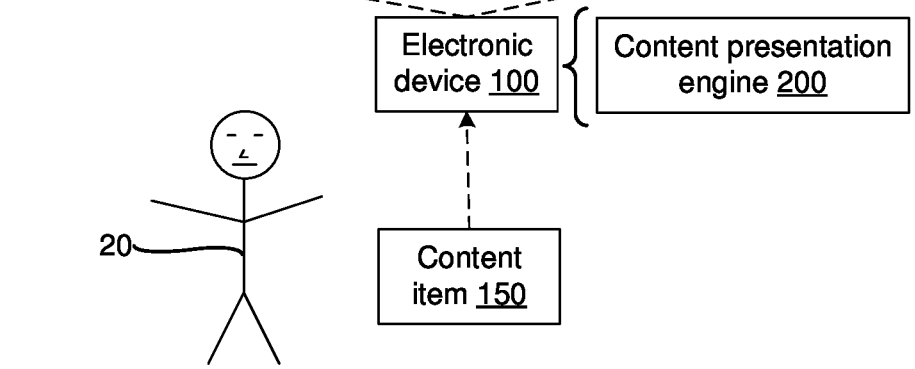

In some implementations, as represented in FIG. 1H, the object 110 is a notification, and the electronic device 100 expands the notification based on the head pose value 130 satisfies a head pose criterion. For example, the head pose criterion may be that a nodding motion exceeds a threshold range of motion. If the head pose value 130 corresponds to a nodding motion that exceeds the threshold range of motion, the electronic device 100 may expand the notification, causing the object 110 to be replaced in the display with an expanded notification 160. The electronic device 100 may mark the notification as having been read.

Figure 1I:
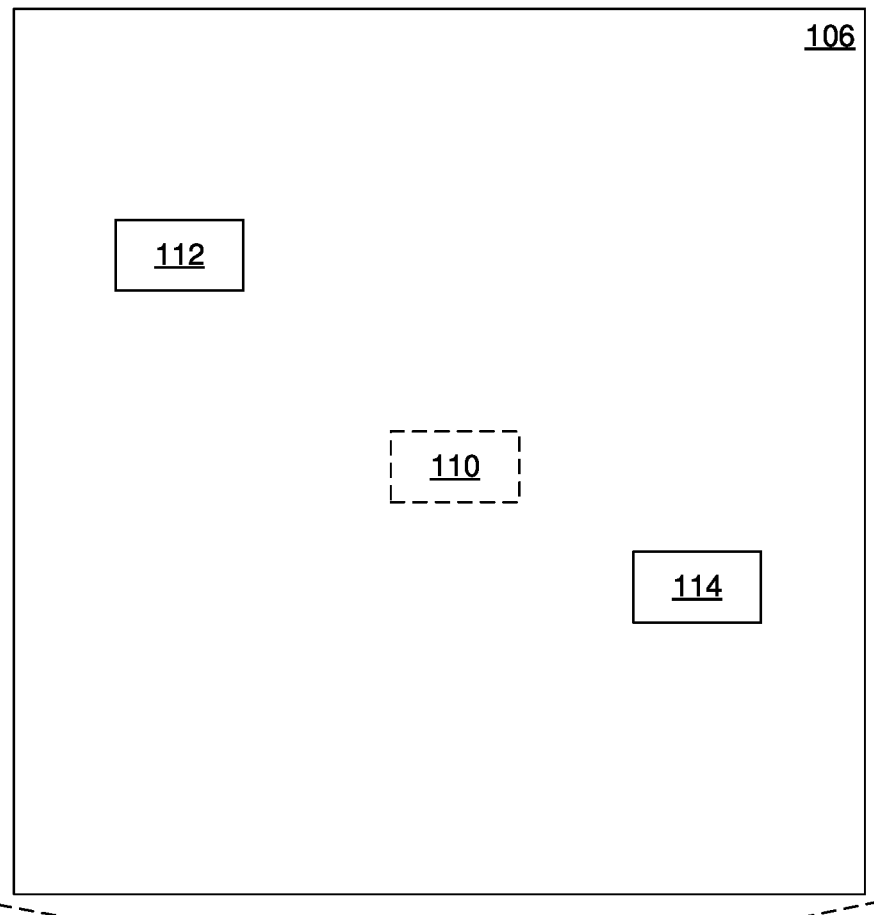
Figure 1I:
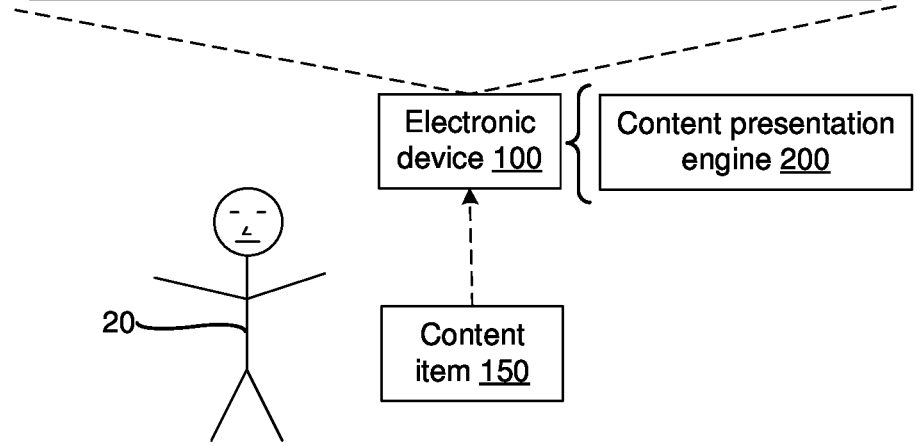

In some implementations, as represented in FIG. 1I, the object 110 is a notification, and the electronic device 100 dismisses the notification based on the head pose value 130 satisfying a head pose criterion. For example, the head pose criterion may be that a lateral head motion exceeds a threshold range of motion. If the head pose value 130 corresponds to a lateral motion of the head exceeding the threshold range of motion, the electronic device 100 may dismiss (e.g., cease to display) the notification, causing the appearance of the object 110 to be altered. For example, the electronic device 100 may display the object 110 with increased transparency, as indicated by the dashed lines in FIG. 1I, or may remove the object 110 from the display. In some implementations, the electronic device 100 marks the notification as having been read.

In some implementations, the electronic device 100 includes or is attached to a head-mountable device (HMD) worn by the user 20. The HIVID presents (e.g., displays) the XR environment 106 according to various implementations. In some implementations, the HMD includes an integrated display (e.g., a built-in display) that displays the XR environment 106. In some implementations, the HMD includes a head-mountable enclosure. In various implementations, the head-mountable enclosure includes an attachment region to which another device with a display can be attached. For example, in some implementations, the electronic device 100 can be attached to the head-mountable enclosure. In various implementations, the head-mountable enclosure is shaped to form a receptacle for receiving another device that includes a display (e.g., the electronic device 100). For example, in some implementations, the electronic device 100 slides/snaps into or otherwise attaches to the head-mountable enclosure. In some implementations, the display of the device attached to the head-mountable enclosure presents (e.g., displays) the XR environment 106. In various implementations, examples of the electronic device 100 include smartphones, tablets, media players, laptops, etc.

Figure 2:
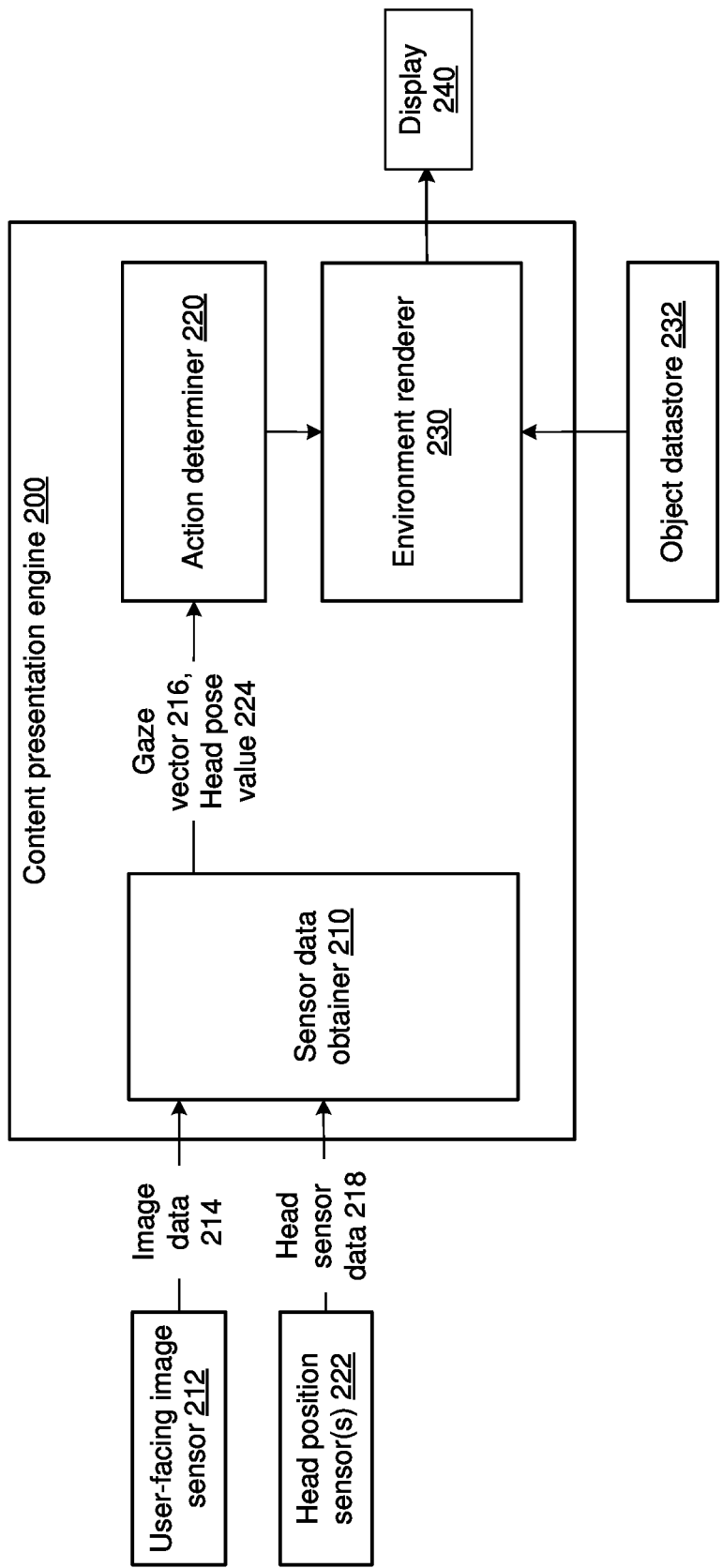
FIG. 2 is a block diagram of a content presentation engine in accordance with some implementations.

FIG. 2 illustrates a block diagram of the content presentation engine 200 in accordance with some implementations. In some implementations, the content presentation engine 200 includes a sensor data obtainer 210, an action determiner 220, and an environment renderer 230. In various implementations, the environment renderer 230 displays an extended reality (XR) environment that includes a set of virtual objects. For example, with reference to FIG. 1A, the environment renderer 230 may display the XR environment 106, including the objects 110, 112, and 114. In various implementations, the environment renderer 230 obtains the virtual objects from an object datastore 232. The virtual objects may represent physical articles. For example, in some implementations, the virtual objects represent equipment (e.g., machinery such as planes, tanks, robots, motorcycles, etc.). In some implementations, the virtual objects represent fictional entities (e.g., fictional articles such as representations of action figures).

In some implementations, the sensor data obtainer 210 obtains sensor data from one or more sensors that interact with a user, e.g., the user 20 of FIG. 1A. For example, a user-facing image sensor 212 (e.g., a front-facing camera or an inward-facing camera) may capture a set of one or more images of the eyes of the user 20 and may generate image data 214. The sensor data obtainer 210 may obtain the image data 214. In some implementations, the sensor data obtainer 210 determines a gaze vector 216 based on the image data 214.

In some implementations, the sensor data obtainer 210 obtains head sensor data 218 from one or more head position sensors 222 that sense the position and/or motion of the head of the user 20. The one or more head position sensors 222 may include, for example, an accelerometer, a gyroscope, a magnetometer, and/or an inertial measurement unit (IMU). The sensor data obtainer 210 may generate a head pose value 224 based on the head sensor data 218.

In some implementations, the action determiner 220 determines an action to perform based on the head pose value 224. The action may be performed relative to a virtual object. For example, the gaze vector 216 may indicate that a gaze of the user 20 is directed to a particular object. The action may be performed relative to the object to which the gaze of the user 20 is directed.

In some implementations, the action determiner 220 determines the action based on the head pose value 224 satisfies a head pose criterion. For example, the head pose criterion may be that a nodding motion exceeds a threshold range of motion. If the head pose value 224 corresponds to a nodding motion that exceeds the threshold range of motion, the action determiner 220 may determine (e.g., select) an action, such as selecting the object on which the gaze of the user 20 is directed.

In some implementations, the action determiner 220 provides an indication of the action to the environment renderer 230. For example, the action determiner 220 may provide an indication that an object has been selected. In some implementations, the environment renderer 230 makes a corresponding modification to the XR environment. For example, if an object has been selected, the environment renderer 230 may modify the XR environment to display a visual effect to indicate that the object has been selected. For example, the environment renderer 230 may modify the XR environment to display an area of increased brightness around the selected object. As another example, the environment renderer 230 may modify the XR environment to display an animation of the selected object. In some implementations, the environment renderer 230 displays the modified XR environment on a display 240.

Figure 3A:
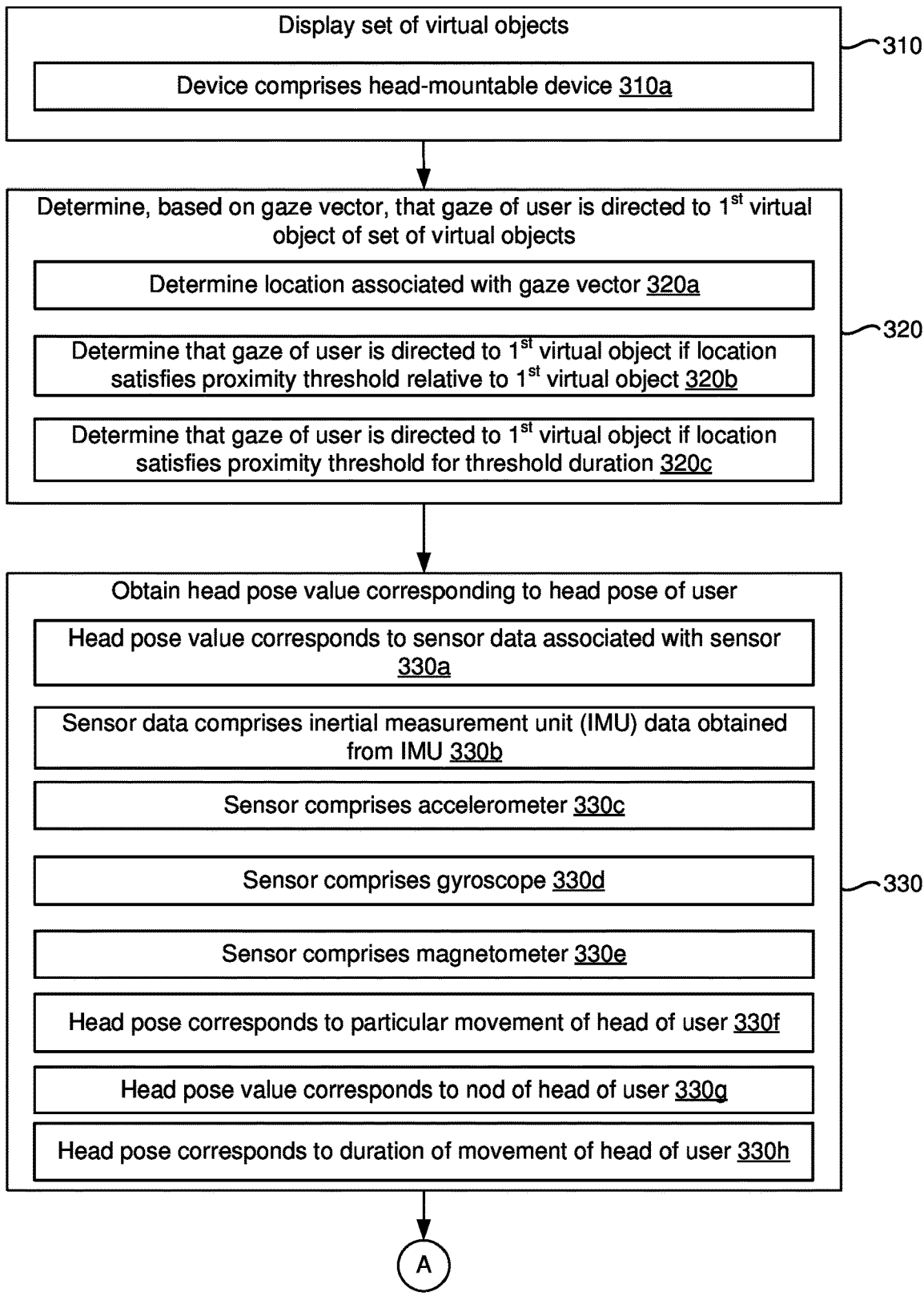
FIGS. 3A-3B are a flowchart representation of a method of using a gaze vector and head pose information to effectuate a user interaction with a virtual object in an extended reality (XR) environment in accordance with some implementations.
Figure 3B:
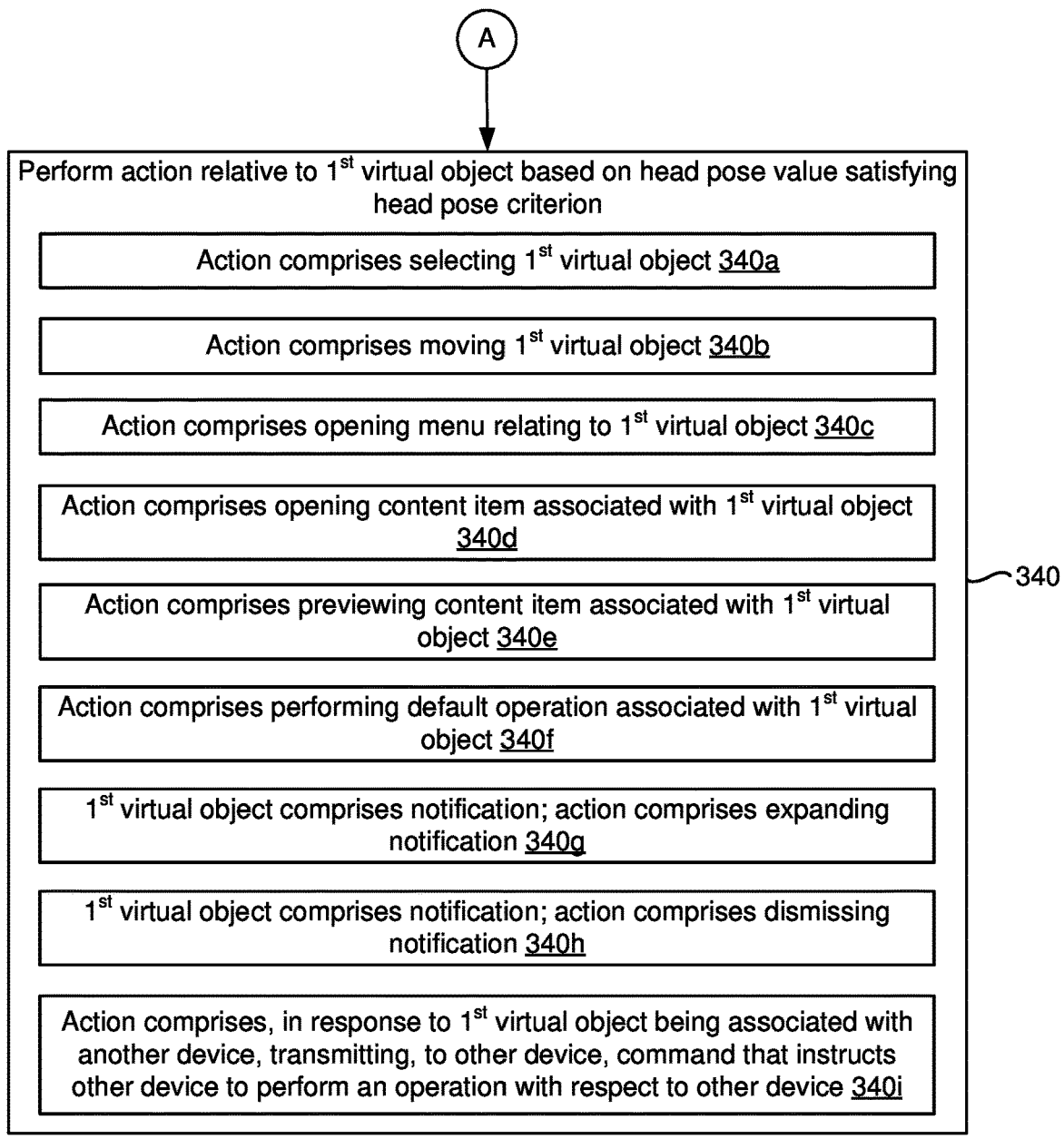

FIGS. 3A-3B are a flowchart representation of a method 300 for using a gaze vector and head pose information to effectuate a user interaction with a virtual object in an extended reality (XR) environment. In various implementations, the method 300 is performed by a device (e.g., the electronic device 100 shown in FIGS. 1A-1I, or the content presentation engine 200 shown in FIGS. 1A-1I and 2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes displaying a set of virtual objects in an XR environment. In some implementations, the XR environment 106 is generated. In some implementations, the XR environment is received from another device that generated the XR environment.

The XR environment may include a virtual environment that is a simulated replacement of a physical environment. In some implementations, the XR environment is synthesized and is different from a physical environment in which the electronic device is located. In some implementations, the XR environment includes an augmented environment that is a modified version of a physical environment. For example, in some implementations, the electronic device modifies the physical environment in which the electronic device is located to generate the XR environment. In some implementations, the electronic device generates the XR environment by simulating a replica of the physical environment in which the electronic device is located. In some implementations, the electronic device removes and/or adds items from the simulated replica of the physical environment in which the electronic device is located to generate the XR environment.

In some implementations, as represented by block 310a, the electronic device includes a head-mountable device (HMD). The HMD may include an integrated display (e.g., a built-in display) that displays the XR environment. In some implementations, the HMD includes a head-mountable enclosure. In various implementations, the head-mountable enclosure includes an attachment region to which another device with a display can be attached. In various implementations, the head-mountable enclosure is shaped to form a receptacle for receiving another device that includes a display. In some implementations, the display of the device attached to the head-mountable enclosure presents (e.g., displays) the XR environment. In various implementations, examples of the electronic device include smartphones, tablets, media players, laptops, etc.

In various implementations, as represented by block 320, the method 300 includes determining, based on a gaze vector, that a gaze of the user is directed to a first virtual object of the set of virtual objects. For example, in some implementations, a user-facing image sensor, such as a front-facing camera or an inward-facing camera, is used to capture a set of one or more images of the eyes of the user. The gaze vector may be determined based on the set of one or more images. In some implementations, as represented by block 320a, the method 300 includes determining a location associated with the gaze vector. For example, the electronic device may determine a location in the XR environment to which the gaze vector is directed.

In some implementations, the electronic device may determine that the gaze vector is directed to one of the objects. For example, as represented by block 320b, the method 300 may include determining that the gaze of the user is directed to the first virtual object of the set of virtual objects on a condition that the location associated with the gaze vector satisfies a proximity threshold relative to the first virtual object. In some implementations, as represented by block 320c, the method 300 may include determining that the gaze of the user is directed to the first virtual object on a condition that the location satisfies the proximity threshold for a threshold duration. For example, the electronic device may forgo determining that the gaze of the user is directed to the first virtual object if the gaze vector is directed to a location near the first virtual object for a time duration that is less than a threshold time duration, e.g., the user merely glances at the first virtual object. In some implementations, the electronic device may display a visual effect in connection with the first virtual object. For example, the electronic device may display an area of increased brightness around the first virtual object. As another example, the electronic device may display an animation of the first virtual object to indicate that the gaze of the user is directed to it.

In various implementations, as represented by block 330, the method 300 includes obtaining a head pose value corresponding to a head pose of the user. In some implementations, as represented by block 330a, the head pose value corresponds to sensor data that is associated with the sensor. For example, the electronic device may include one or more sensors that are configured to sense the position and/or motion of the head of the user. In some implementations, as represented by block 330b, the sensor data includes inertial measurement unit (IMU) data that is obtained from an IMU. As represented by block 330c, in some implementations, the sensor includes an accelerometer. In some implementations, as represented by block 330d, the sensor includes a gyroscope. As represented by block 330e, in some implementations, the sensor includes a magnetometer.

As represented by block 330f, the head pose value may correspond to a particular movement of a head of the user. For example, as represented by block 330g, the head pose value may correspond to a nod of a head of the user. The head pose value may indicate a degree of motion of the head (e.g., a radial distance that the head moves, for example, a size of an arc followed by the head). In some implementations, different actions are performed based on a degree of the motion. For example, a small nod (e.g., a nod with a radial distance less than a threshold radial distance) may trigger the device to perform a first action, such as expanding a notification to display additional information and an affordance that can be activated by the user. A large nod (e.g., a nod with a radial distance that is at least the threshold radial distance) may trigger the device to perform a second action that is different from the first action, such as automatically activating the affordance without expanding the notification and waiting for the user to activate the affordance.

The head pose value may correspond to other head movements, such as horizontal or lateral movements, tilting, and the like. In some implementations, as represented by block 330h, the head pose value corresponds to a duration of a movement of a head of the user. For example, the head pose value may correspond to a duration over which a nodding motion is maintained.

In various implementations, as represented by block 340 of FIG. 3B, the method 300 includes performing an action relative to the first virtual object based on the head pose value satisfies a head pose criterion. For example, the head pose criterion may be that a nodding motion exceeds a threshold range of motion. If the head pose value corresponds to a nodding motion that exceeds the threshold range of motion, the electronic device may perform an action. In some implementations, as represented by block 340a, the action includes selecting the first virtual object. The electronic device may display a visual effect in connection with the first virtual object to indicate that it has been selected. For example, the electronic device may display an area of increased brightness around the first virtual object to indicate that the first virtual object has been selected. As another example, the electronic device may indicate selection of the first virtual object by displaying an animation of the first virtual object. The animation may be physics-based. For example, if the first virtual object corresponds to a card, the electronic device may display a flexing animation.

In some implementations, as represented by block 340b, the action includes moving the first virtual object. The movement of the first virtual object may be performed according to the head pose value. For example, the electronic device may display a movement of the first virtual object in a direction similar to a direction of a movement of the head of the user. In some implementations, the electronic device may continue to display the movement of the first virtual object while the head pose value satisfies a head pose criterion. The electronic device may cease displaying the movement of the first virtual object (e.g., so the first virtual object appears to stop moving) when the head pose value no longer satisfies the head pose criterion.

As represented by block 340c, the action may include opening a menu relating to the first virtual object. For example, the head pose criterion may be that a rotational motion of the head exceeds a threshold degree of rotation. If the head pose value corresponds to a rotational motion of the head exceeding the threshold degree of rotation, the electronic device may display a menu near the first virtual object. The menu may allow the user to initiate various operations in connection with the first virtual object, such as copying, deleting, selecting, deselecting, and/or editing the first virtual object. The options displayed in the menu may be determined, for example, based on a type of the first virtual object or other contextual information. In some implementations, the electronic device may display the menu until the user dismisses the menu by performing another gesture. For example, the electronic device may display the menu until the head pose value no longer satisfies the head pose criterion.

In some implementations, as represented by block 340d, the action includes opening a content item that is associated with the first virtual object. For example, the head pose criterion may be a lateral motion of the head that exceeds a threshold range of motion. If the head pose value corresponds to a lateral motion of the head exceeding the threshold range of motion, the electronic device may access the content item and cause the content item to be outputted using a corresponding output device, e.g., a speaker and/or a display. The content item may be or may include an audio content item, a video content item, an image, and/or a document. In some implementations, the content item is stored in the electronic device. In some implementations, the content item is stored externally from the electronic device and is accessed remotely by the electronic device, e.g., via a communication network.

In some implementations, as represented by block 340e, the action includes previewing a content item that is associated with the first virtual object. For example, if the electronic device determines that the user's gaze is directed to the first virtual object, a portion of a content item corresponding to the first virtual object may be retrieved. If the electronic device determines that a head pose value satisfies a head pose criterion (e.g., the head pose value corresponds to a nodding motion), the electronic device may cause the retrieved portion of the content item to be outputted using an output device, such as a speaker and/or a display.

In some implementations, as represented by block 340f, the action includes performing a default operation that is associated with the first virtual object. The default operation may be dependent on a type of the virtual object. For example, if the virtual object corresponds to a shortcut for an application, the default operation may be opening the application. On the other hand, if the virtual object corresponds to a uniform resource locator (URL), the default operation may be opening a website corresponding to the URL. As another example, if the virtual object corresponds to a contact entry, the default operation may be initiating a communication session via a default communication modality.

In some implementations, as represented by block 340g, the first virtual object includes a notification, and the action includes expanding the notification. For example, the head pose criterion may be that a nodding motion exceeds a threshold range of motion. If the head pose value corresponds to a nodding motion that exceeds the threshold range of motion, the notification may be expanded. The first virtual object may be replaced in the display with an expanded notification. For example, if the first virtual object is an icon, the first virtual object may be replaced by a banner notification that displays a descriptive text corresponding to the notification. In some implementations, the notification is marked as having been read.

In some implementations, as represented by block 340h, the first virtual object includes a notification, and the action includes dismissing the notification. For example, the head pose criterion may be that a lateral head motion exceeds a threshold range of motion. If the head pose value corresponds to a lateral motion of the head exceeding the threshold range of motion, the electronic device may dismiss the notification, causing the appearance of the first virtual object to be altered. For example, if the first virtual object is a banner notification, the first virtual object may be displayed with increased transparency or may be removed from the display. In some implementations, the notification is marked as having been read.

In some implementations, as represented by block 340i, the action includes, in response to the first virtual object being associated with another device, transmitting, to the other device, a command that instructs the other device to perform an operation with respect to the other device. For example, if the virtual object is a virtual toggle switch (e.g., a virtual light switch or a virtual lock) that represents a physical toggle switch (e.g., a physical light switch or a physical lock), performing the action may include transmitting a toggle command to the physical toggle switch.

Figure 4:
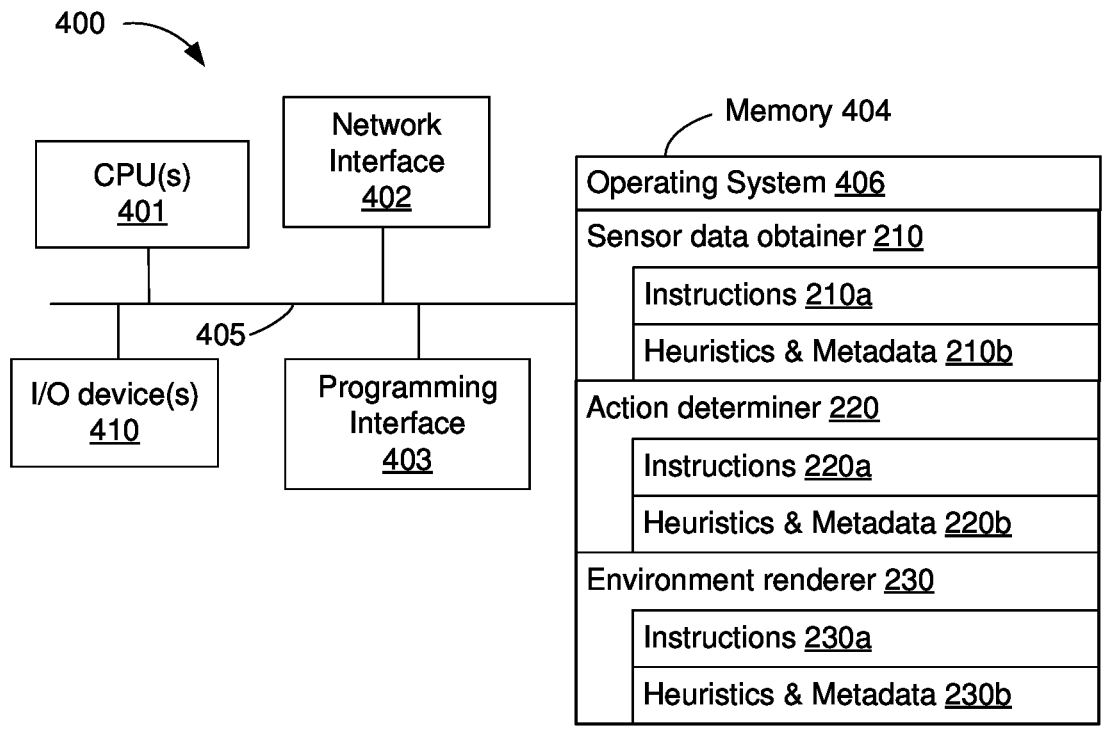
FIG. 4 is a block diagram of a device that uses a gaze vector and head pose information to effectuate a user interaction with a virtual object in an XR environment in accordance with some implementations.

FIG. 4 is a block diagram of a device 400 in accordance with some implementations. In some implementations, the device 400 implements the electronic device 100 shown in FIGS. 1A-1I, and/or the content presentation engine 200 shown in FIGS. 1A-1I and 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the sensor data obtainer 210, the action determiner 220, and the environment renderer 230. In various implementations, the device 400 performs the method 300 shown in FIG. 3.

In some implementations, the sensor data obtainer 210 obtains sensor data from one or more sensors that interact with a user, e.g., the user 20 of FIG. 1A. The sensors may include, for example, a user-facing image sensor and/or one or more head position sensors (e.g., an accelerometer, a gyroscope, a magnetometer, and/or an IMU). In some implementations, the sensor data obtainer 210 performs at least some of the operation(s) represented by blocks 320 and 330 in FIG. 3. To that end, the sensor data obtainer 210 includes instructions 210a and heuristics and metadata 210b.

In some implementations, the action determiner 220 determines an action to perform based on a head pose value satisfying a head pose criterion. The action may be performed relative to a virtual object, e.g., indicated by a gaze vector. In some implementations, the action determiner 220 performs the operation(s) represented by block 340 in FIG. 3. To that end, the action determiner 220 includes instructions 220a and heuristics and metadata 220b.

In some implementations, the environment renderer 230 displays an extended reality (XR) environment that includes a set of virtual objects. The environment renderer 230 may modify the XR environment based on actions determined by the action determiner 220. In some implementations, the environment renderer 230 performs the operations represented by block 310 in FIG. 3. To that end, the environment renderer 230 includes instructions 230a and heuristics and metadata 230b.

In some implementations, the one or more I/O devices 410 include a user-facing image sensor (e.g., the user-facing image sensor 212 of FIG. 2, which may be implemented as a front-facing camera or an inward-facing camera). In some implementations, the one or more I/O devices 410 include one or more head position sensors (e.g., the head position sensors 222 of FIG. 2) that sense the position and/or motion of the head of the user. The one or more head position sensors 222 may include, for example, an accelerometer, a gyroscope, a magnetometer, and/or an inertial measurement unit (IMU). In some implementations, the one or more I/O devices 410 include a display for displaying the graphical environment (e.g., for displaying the XR environment 106). In some implementations, the one or more I/O devices 410 include a speaker for outputting an audible signal.

In various implementations, the one or more I/O devices 410 include a video pass-through display which displays at least a portion of a physical environment surrounding the device 400 as an image captured by a scene camera. In various implementations, the one or more I/O devices 410 include an optical see-through display which is at least partially transparent and passes light emitted by or reflected off the physical environment.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
   at a head-worn device comprising a sensor for sensing a head pose of a user, a gaze-tracking device, a display, one or more processors, and a memory:
   displaying, on the display, a set of virtual objects;
   obtaining, via the gaze-tracking device, a gaze vector;
   detecting a selection of a first virtual object from the set of virtual objects based on the gaze vector indicating that a gaze of the user is directed to the first virtual object;
   after detecting the selection of the first virtual object via the gaze of the user, obtaining, via the sensor, a head pose value corresponding to the head pose of the user;
   in accordance with a determination that the head pose value satisfies a first head pose criterion indicative of head motion in a first direction of a first radial distance at least a first threshold radial distance, performing a first action relative to the first virtual object; and in accordance with a determination that the head pose value does not satisfy the first head pose criterion, performing a second action relative to the first virtual object based on the head pose value satisfying a second head pose criterion indicative of head motion in the first direction of a second radial distance less than the first threshold radial distance and at least a second threshold radial distance.

2. The method of claim 1, wherein determining that the gaze of the user is directed to the first virtual object comprises:

determining a location associated with the gaze vector; and determining that the gaze of the user is directed to the first virtual object on a condition that the location satisfies a proximity threshold relative to the first virtual object for a threshold time duration.

3. The method of claim 1, wherein the sensor comprises an inertial measurement unit (IMU) and wherein obtaining the head pose value comprises:

obtaining IMU data from the IMU; and determining the head pose value based on the IMU data obtained from the IMU.

4. The method of claim 1, wherein the sensor comprises an image sensor and wherein obtaining the head pose value comprises:

obtaining image data from the image sensor; and determining the head pose value based on the image data obtained from the image sensor.

5. The method of claim 1, wherein the first action comprises moving the first virtual object.

6. The method of claim 1, wherein the first action comprises opening a menu relating to the first virtual object.

7. The method of claim 1, wherein the first action comprises opening a content item associated with the first virtual object.

8. The method of claim 1, wherein the first virtual object comprises a notification, and wherein the first second action comprises expanding the notification.

9. The method of claim 1, wherein the first action comprises, in response to the first virtual object being associated with another device, transmitting, to the other device, a command that instructs the other device to perform an operation with respect to the other device.

10. The method of claim 1, wherein the head-worn device comprises a head-mountable device (HMD).

11. A head-worn device comprising:

one or more processors;
a non-transitory memory;
a display;
a gaze-tracking device;
a sensor for sensing a pose of a user; and
one or more programs stored in the non-transitory memory, which, when executed by the one or more processors, cause the head-worn device to:
display, on the display, a set of virtual objects;
obtain, via the gaze-tracking device, a gaze vector;
detect a selection of a first virtual object from the set of virtual objects based on the gaze vector indicating that a gaze of the user is directed to the first virtual object;

after detecting the selection of the first virtual object via the gaze of the user, obtain, via the sensor, a head pose value corresponding to the head pose of the user;

in accordance with a determination that the head pose value satisfies a first head pose criterion indicative of head motion in a first direction of a first radial distance at least a first threshold radial distance, perform a first action relative to the first virtual object; and in accordance with a determination that the head pose value does not satisfy the first head pose criterion, perform a second action relative to the first virtual object based on the head pose value satisfying a second head pose criterion indicative of head motion in the first direction of a second radial distance less than the first threshold radial distance and at least a second threshold radial distance.

12. A non-transitory memory storing one or more programs, which, when executed by one or more processors of a head-worn device with a display, a gaze-tracking device and a sensor for sensing a pose of a user, cause the head-worn device to:

display, on the display, a set of virtual objects;
obtain, via the gaze-tracking device, a gaze vector;
detect a selection of a first virtual object from the set of virtual objects based on the gaze vector indicating that a gaze of the user is directed to the first virtual object;
after detecting the selection of the first virtual object via the gaze of the user, obtain, via the sensor, a head pose value corresponding to the head pose of the user;
in accordance with a determination that the head pose value satisfies a first head pose criterion indicative of head motion in a first direction of a first radial distance at least a first threshold radial distance, perform a first action relative to the first virtual object; and
in accordance with a determination that the head pose value does not satisfy the first head pose criterion, perform a second action relative to the first virtual object based on the head pose value satisfying a second head pose criterion indicative of head motion in the first direction of a second radial distance less than the first threshold radial distance and at least a second threshold radial distance.

13. The method of claim 8, wherein expanding the notification includes displaying an affordance for performing the first action.

14. The method of claim 1, further comprising, on a condition that the gaze of the user is directed to the first virtual object, displaying a visual effect in association with the first virtual object including an indication of the first direction.

15. The method of claim 14, wherein the visual effect further includes an indication of the head pose value.

16. The method of claim 15, wherein the visual effect further includes an indication of at least one of the first threshold radial distance or the second threshold radial distance.

17. The method of claim 15, wherein the visual effect further includes an indication that the head pose values satisfies at least one of the first head pose criterion or the second head pose criterion.

18. The method of claim 1, further comprising:

in accordance with a determination that the head pose value does not satisfy the second head pose criterion, performing a third action relative to the first virtual object based on the head pose value satisfying a third head pose criterion indicative of head motion in a second direction, different than the first direction, of a third radial distance at least a third radial threshold.

\* \* \* \* \*